Dec. 6, 1955 W. N. BREWER ET AL 2,726,006
CLOSURE FOR HIGH PRESSURE VESSELS
Filed May 26, 1949

INVENTORS
Robert Mayne
Herman E. Sheets
BY Wendell N. Brewer
ATTORNEY

United States Patent Office 2,726,006
Patented Dec. 6, 1955

2,726,006

CLOSURE FOR HIGH PRESSURE VESSELS

Wendell N. Brewer, Herman E. Sheets, and Robert Mayne, Akron, Ohio, assignors to Goodyear Aircraft Corporation, Akron, Ohio, a corporation of Delaware Application May 26, 1949, Serial No. 95,475

6 Claims. (Cl. 220—24.5)

This invention relates to pressure vessels and in particular to closures for such vessels.

Heretofore, it has been known to use closures for high pressure vessels whereby the inside pressure supplies the force to tighten the cover seal and to increase the sealing force with increase in pressure. However, constructions of this type known in prior art have the disadvantage of being more or less complicated or too heavy and, therefore, not applicable especially for purposes in which light weight and low cost of production are important considerations as, for instance, in solid propellant rocket units and similar products.

It is the general object of the invention to avoid the foregoing and other disadvantages of and objections to prior art practices by the provision of a substantially spherical calotte-shaped, inwardly curved, closure cover made of sheet material, usually metal, which under pressure expands against a packing ring seated upon a removable annular abutment inserted in a groove of the vessel wall to seal the cover against the wall.

Another object of the invention is to provide for a loose closure cover of a pressure vessel a snap abutment ring inserted in a groove cut into the vessel wall and which is forced into the groove by a radial component of the interior pressure acting upon the cover and to avoid the tendency of the ring of being rolled from the groove by the pressure.

Another object of the invention is to provide an improved strong, light closure for a rocket.

Another object of the invention is to provide a vessel closure of least weight and utmost simplicity in construction requiring a minimum of labor and workmanship to obtain a uniform and perfect joint seal, especially advantageous for closures of large diameter.

Another object of the invention is the possibility of quickly inserting and removing the cover from the vessel.

Another object of the invention is to keep the loose cover closed also at atmospheric pressure.

Another object of the invention is low cost in manufacture.

The aforesaid objects of the invention, and other objects which will become apparent as the description proceeds are achieved by providing a pressure vessel with a cover extending inwardly and being of substantially spherical calotte-shape with its circumferential edge seated against an annular gasket resting on an abutment ring inserted in a groove in the vessel wall and radially extending therefrom. For keeping the vessel closed at no internal overpressure the cover is pressed against its seat by a spring resting on a fixed support in the vessel.

For a better understanding of the invention reference should be had to the accompanying drawing, wherein.

Figure 1:
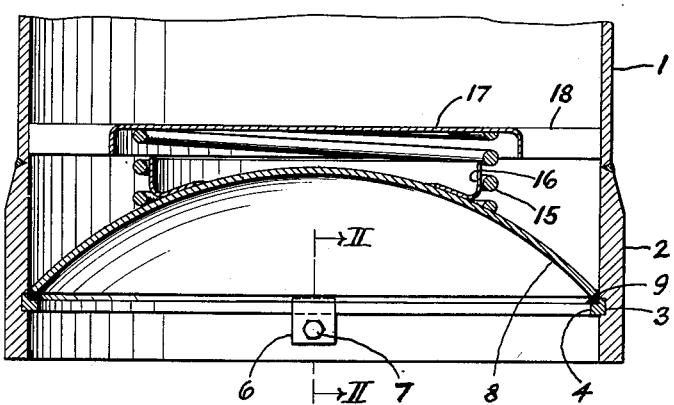
Fig. 1 is a fragmentary longitudinal cross-sectional view of a cylindrical pressure vessel showing one preferable embodiment of the invention.
Figure 2:
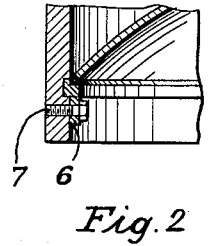
Fig. 2 is a fragmentary longitudinal view taken on line II—II of Fig. 1.
Figure 3:
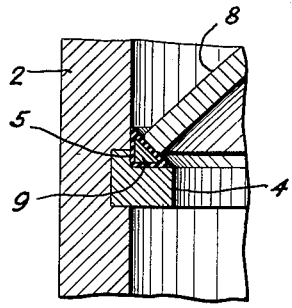
Fig. 3 shows enlarged a detail of Fig. 1.

Although the invention is illustrated in connection with the open end of a cylindrical high pressure vessel it may be applied to pressure vessels of any shape and to any position on a vessel.

With specific reference to the form of the invention illustrated in the drawing numeral 1 indicates a cylindrical vessel wall, preferably made of metal, having a reinforced portion 2 at its open end into which is cut an annular rectangular groove 3 for holding a snap abutment ring 4 radially extending therefrom and the ends of which being spaced apart for making its insertion in the groove possible. Ring 4 is provided on the outside with a ring shoulder 5 facing inwardly and being flush with the vessel wall. The space between the ring ends is filled out by a filler block 6 fastened by a screw 7 to the vessel. The vessel opening is closed by a loosely fitting, substantially spherical calotte-shaped, cover 8 made of sheet material which rests with its circumferential edge against a triangular sealing ring 9 positioned in the corner formed on the ring by the shoulder 5 and is also in contact with the inner face of the vessel wall. The edge portion of the cover 8 forms with the cover base an angle of about 30 to 45 degrees so that under pressure the cover will somewhat deflect and exert a transverse pressure component which forces the sealing ring 9 against the shoulder 5 of the abutment ring 4 and against the vessel wall 2 to seal the joint therebetween and force the abutment ring 4 into its groove by the pressure acting upon the cover 8 and thus avoid the tendency of rolling the abutment ring out therefrom. In fact, the greater the interior pressure, the tighter the seal will become and the more the abutment ring will be forced against the base of its groove. This construction also has the advantage that the sealing ring may have a loose fit against the cylindrical wall for easy assembly and that even if the round shape of the vessel should be slightly distorted a tight seal can still be obtained. The sealing ring may have any suitable material which has a lower yield or plasticity limit than the material which it is to contact. It may be made of material, uniform throughout, either metal or rubber and the like, or it may consist of a combination of such materials by using a core being made of harder material surrounded by a softer material.

Figure 5:
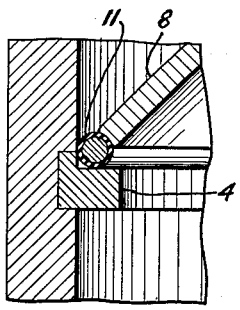
Figs. 4, 5, 6 and 7 show modification of the sealing ring construction and in Figs. 6 and 7, the abutment ring is shown with a reinforcing ring underneath.
Figure 4:
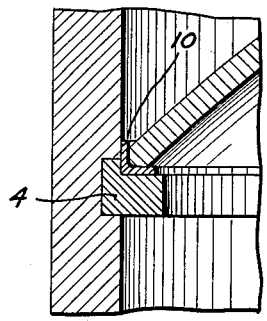

In Fig. 4 is shown a sealing ring 10 having an angular cross-section of relatively thin stock, whereas, in Fig. 5 the gasket 11 has a round cross-section including a metal core covered with rubber or the like.

Figure 6:
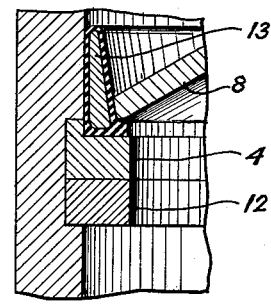
Figure 7:
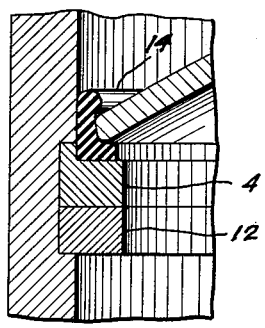

In Figs. 6 and 7 the abutment ring 4, in order to give it greater shear strength, has added a ring 12. In Fig. 6 the packing ring 13 has a wedge shaped metal core surrounded by a rubber coat sealing the cover 8 against the vessel and in Fig. 7 the packing ring 14 is made of rubber only. It is obvious that any combination of abutment rings and sealing rings may be made, depending on suitability for the requirements under certain conditions. Also, the sealing ring may be inserted in the vessel as a separate unit or it may be cemented to the cover making assembling easier.

To keep the cover 8 on its seat without interior overpressure, a spring 15 is inserted between the cover, which is provided with a ring 16 for centering the spring on the cover 8, and a disk 17 having supports 18 fastened to the vessel.

It will be recognized that the objects of the invention have been achieved by using the least number of parts which can be readily assembled and taken apart. The removable snap abutment ring supporting the cover seal is securely held in place by providing a shoulder thereon upon which acts a radial component of the pressure force acting upon the cover. Thus, the tendency of the abutment ring of rolling out from its groove by axial pressure is avoided. Because of its concave shape, but also because the cover is made of sheet material, it has a certain flexibility and will, when pressure is applied, expand radially against the sealing ring covering the joint between abutment ring and vessel wall with a force which is the greater the more the interior pressure is increased. Since the cover has a smaller diameter than the vessel and the sealing ring may have a loose fit therein assembling of the parts is easy, their workmanship does not require a high degree of accuracy in order to obtain a most effective cover seal with the additional advantage of saving labor and cost. The invention has the further advantage that it can be profitably applied not only for very high pressure but also for low pressure.

While certain representative embodiments and details have been shown for the purpose of illustrating the invention, it will be apparent to those skilled in this art that various changes and modifications may be made therein without departing from the spirit or scope of the invention.

What we claim:

1. In combination with a pressure vessel having an open cylindrical portion provided with an inner annular groove, a snap abutment ring releasably secured in said groove, said ring having a radially-extending shoulder portion and an axially-parallel shoulder portion, a sealing ring for contacting the vessel wall and the radial and axial shoulder portions of said abutment ring, and a loose cover of sheet material being seated on said sealing ring, pressure on the cover applying both radial and axial pressures to the abutment ring and pressure to the vessel wall through the sealing ring.

2. In combination with a pressure vessel having an open cylindrical portion provided with an inner annular groove, a snap abutment ring releasably secured in said groove, said ring having a radially-extending shoulder portion and an axially-parallel shoulder portion, a sealing ring for contacting the vessel wall and the radial and axial shoulder portions of said abutment ring, and a loose cover of sheet material of substantially spherical calotte-shape seated on said sealing ring, pressure on the cover applying both radial and axial pressures to the abutment ring and pressure to the vessel wall through the sealing ring.

3. In combination with a pressure vessel having an open cylindrical portion provided with an inner annular groove, a snap abutment ring releasably secured in said groove, said ring having a radially-extending shoulder portion and an axially-parallel shoulder portion flush with the inner face of the vessel wall, a sealing ring for contacting the vessel wall and the radial and axial shoulder portions of said abutment ring, and a loose cover of sheet material being seated on said sealing ring, and being radially expandable thereagainst for closing the opening of said cylindrical portion to be sealed by the sealing ring solely through vessel pressure.

4. In combination with a pressure vessel having an open cylindrical portion provided with an inner annular groove, a snap abutment ring releasably secured in said groove, said ring having a radially-extending shoulder portion and an axially-parallel shoulder portion, a sealing ring for contacting the vessel wall and the radial and axial shoulder portions of said abutment ring, and a loose cover of sheet material of substantially spherical calotte-shape and having an edge portion forming an angle of about 30 to 45 degrees with the base thereof seated on said sealing ring, pressure on the cover applying both radial and axial pressures to the abutment ring and pressure to the vessel wall through the sealing ring.

5. In combination with a pressure vessel having an open cylindrical portion provided with an inner annular groove, a removable abutment ring having spaced ends being inserted in said groove, said ring having an upper portion flush with the inner surface of said vessel and a lower inwardly extending portion, the ring portions forming, respectively, a cylindrical seat and a radially extending seat, a filler block inserted between said ring ends supplementing the missing ring portion therebetween and being removably fixed to the vessel, a sealing ring placed in the corner formed by the cylindrical and radial seats of said abutment ring, and a loose sheet metal cover of substantially spherical calotte shape being seated with its edge against said sealing ring and with its concavity facing outwardly of the vessel, said cover being radially expandable against said sealing ring when inside pressure is applied to force the sealing ring automatically into sealing contact with said abutment ring and the vessel wall with a force increasing in proportion to the increase of the pressure applied.

6. In combination with a cylindrical body of a rocket having an open end provided with an inner annular groove, an abutment ring being inserted in said groove, said ring having an upper portion flush with the inner surface of said body and a lower, inwardly extending portion, the ring portions forming, respectively, a cylindrical seat and a radially extending seat, a sealing ring placed in the corner formed by said seats, a loose sheet metal cover of substantially spherical calotte shape with its concavity facing outwardly of the vessel being seated with its edge against said sealing ring and being radially expandable when interior pressure is applied to obtain a perfect seal, and separate resilient means fixedly supported in said body for keeping the cover closed in absence of interior superpressure.

References Cited in the file of this patent

UNITED STATES PATENTS

| 1,801,006 | Jacoby | Apr. 14, 1931 |
| 2,146,536 | Evans | Feb. 7, 1939 |
| 2,196,895 | Bowman | Apr. 9, 1940 |
| 2,379,053 | Weingart | June 26, 1945 |
| 2,491,139 | Simonsen | Dec. 13, 1949 |

FOREIGN PATENTS

| 645,714 | France | July 3, 1928 |